March 23, 1965 S. W. BARKER 3,174,312
THREAD TREATING MACHINES
Filed Sept. 19, 1961 11 Sheets-Sheet 6

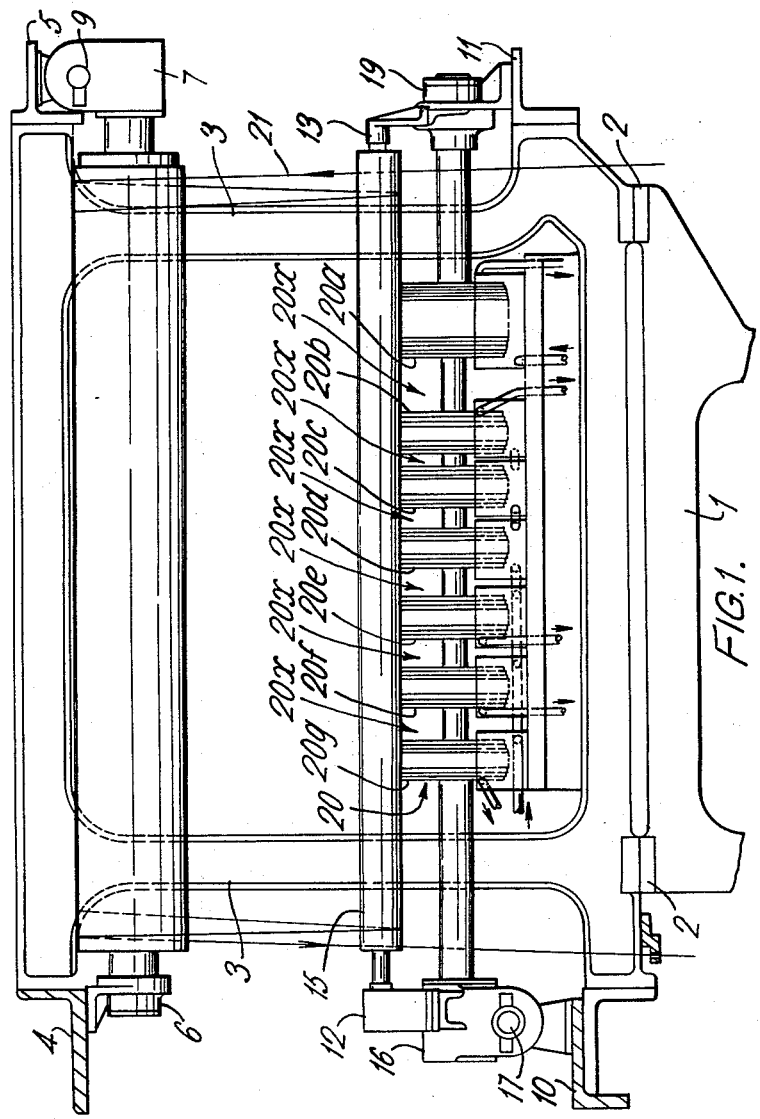

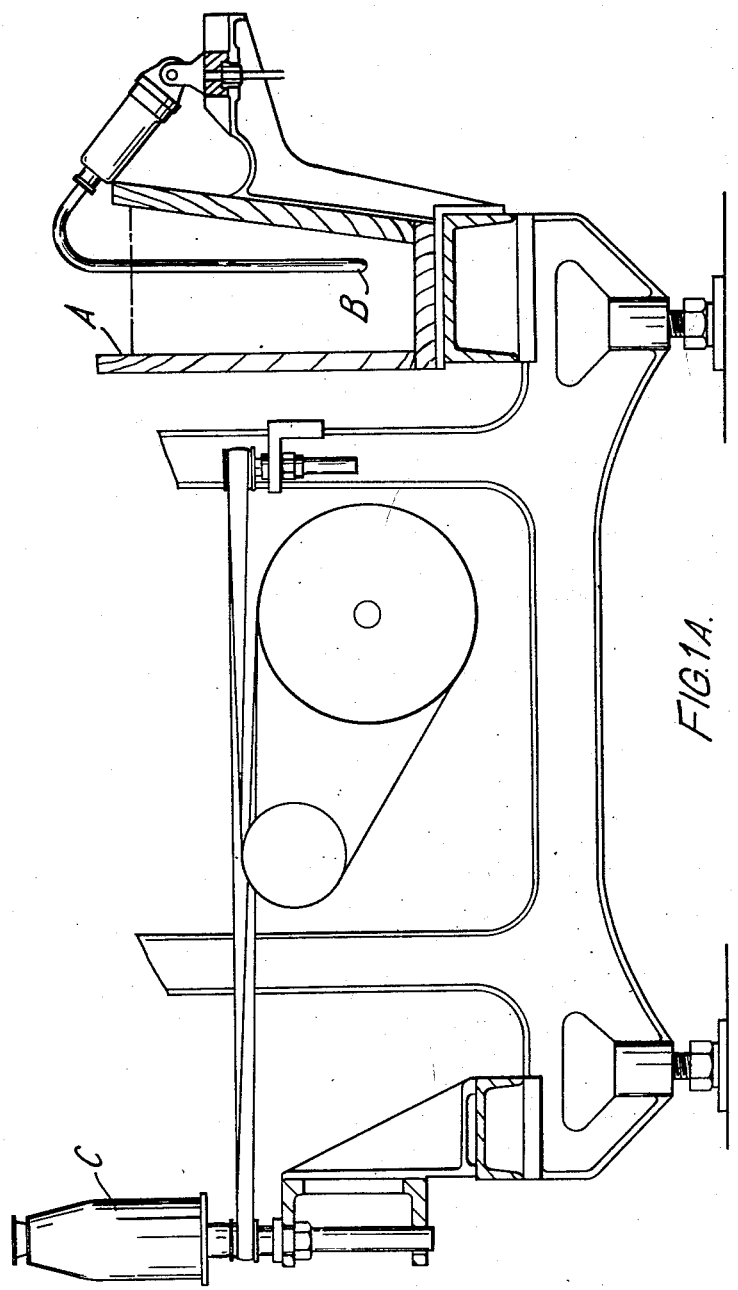

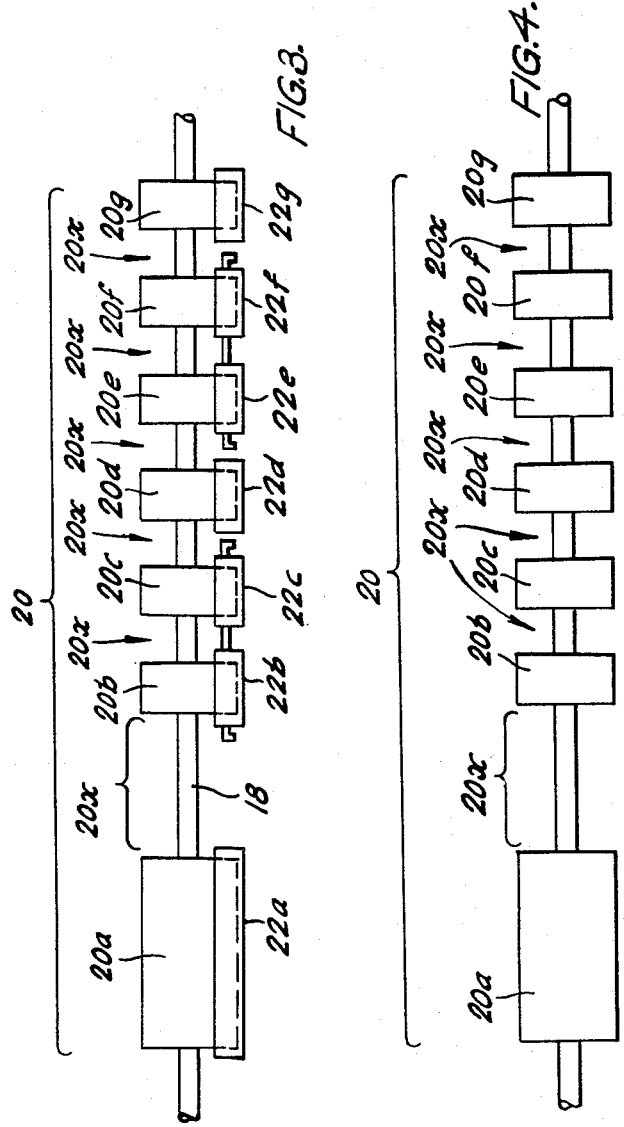

Inventor:
Sydney Warren Barker
By Ken W Flocks
Attorney

March 23, 1965    S. W. BARKER    3,174,312
THREAD TREATING MACHINES
Filed Sept. 19, 1961    11 Sheets-Sheet 8

Inventor:
Sydney Warren Barker
By [signature]
Attorney

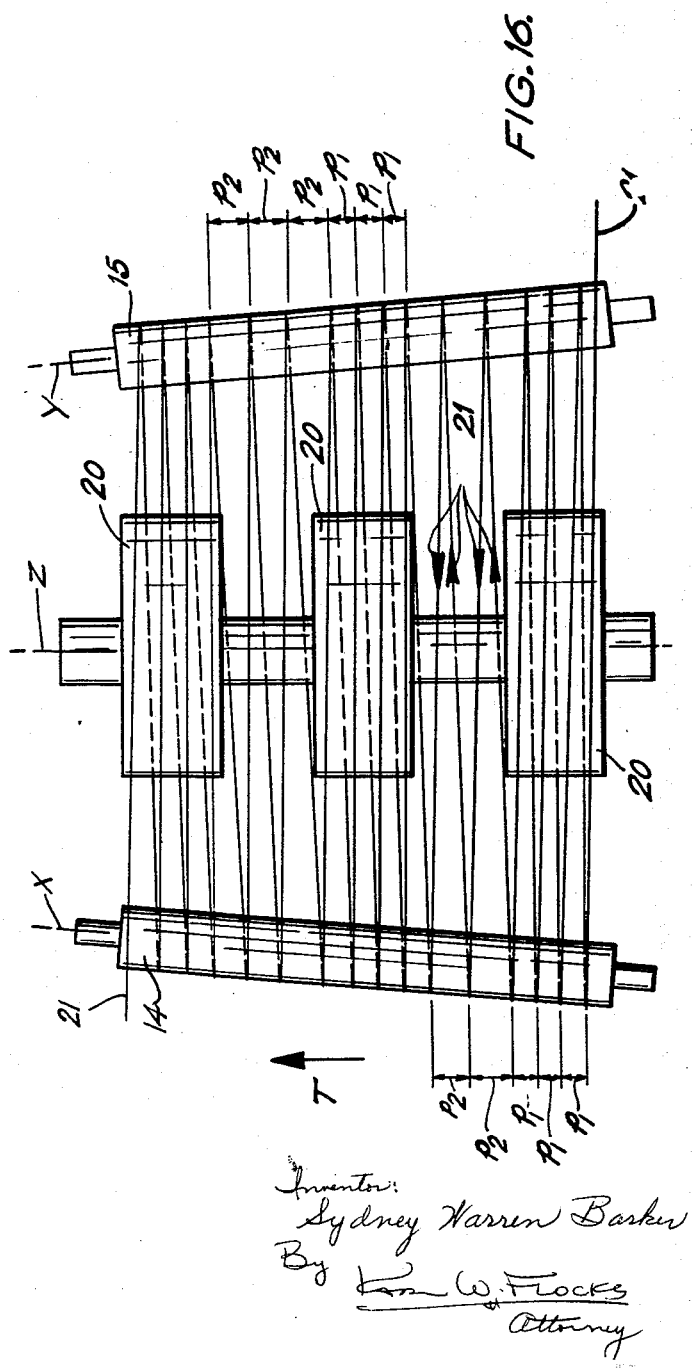

March 23, 1965 S. W. BARKER 3,174,312
THREAD TREATING MACHINES
Filed Sept. 19, 1961 11 Sheets-Sheet 11

Inventor:
Sydney Warren Barker
By Karl W. Flocks
Attorney

United States Patent Office 3,174,312
Patented Mar. 23, 1965

3,174,312
THREAD TREATING MACHINES
Sydney Warren Barker, Colne, England, assignor to Nelvale Limited, Nelson, England, a British company
Filed Sept. 19, 1961, Ser. No. 139,188
Claims priority, application Great Britain, Sept. 24, 1960, 32,903; Feb. 28, 1961, 7,214; May 5, 1961, 16,317
20 Claims. (Cl. 68—176)

This invention relates to thread treating machines of the kind commonly known as thread-storing, thread-advancing machines in which a pair of elongated rolls are mounted on nearly parallel axes and driven at the same circumferential speed, the thread or yarn being looped around both rolls for their full lengths. The thread may be a viscose yarn drawn from a spinning jet in a coagulating bath on to the input ends of the rolls and delivered from the output ends to a bobbin on which it is wound.

In machines of the above general kind, it is customary to apply various treatment liquors to the thread as it passes along the rolls. Hitherto, this has normally been done by feeding the treatment liquor to jets located above one (usually the lower) roll at appropriate intervals along its length. Such an arrangement, however, suffers from the disadvantage that the treatment liquors tend to spread along the rolls and to intermingle so as to reduce the effectiveness and efficiency of the treatment process.

Attempts to prevent spread of the liquors along the rolls have included the formation of skew or helical grooves arranged in circumferential bands around the rolls at the intended boundaries of the several treatment zones. The "hand" of the grooves in each band is such as to simulate the action of a screw-thread type liquid seal. Gapped flanges and non-wetting zones have also been tried for the purpose of preventing spread of the treatment liquors, but none of these expedients has been found entirely satisfactory. This is largely due to the tendency of the liquor to accumulate on the roll surface.

It is an object of the present invention to obviate the above disadvantages by providing a thread-storing, thread-advancing machine in which treatment liquor is applied to the thread by an intermediate treatment roll which contacts the thread as it passes between successive main rolls, each treatment zone being defined by a respective full-diameter land of the treatment roll and succesive lands being separated by radially deep gaps.

Another object of the present invention is to provide a treatment roll unit comprising a series of coaxial treatment rolls spaced apart on a common shaft, the gaps between adjacent rolls having a maximum radial depth equal to the difference in radius of the shaft and the circumferential surface of the roll.

In this way, the next succeeding main roll to which the thread passes from the treatment roll is only wetted by liquor carried thereto on the thread, and a substantial reduction is achieved in the amount of each treatment liquor on the surface of the main roll. Intermingling of treatment liquors on the surface of the treatment roll is prevented by the deep radial gaps between successive lands or rolls, and in order to enhance this effect the invention envisages the provision of treatment rolls of relatively large diameter.

Another object of the present invention is to reduce still further the risk of accumulation of treatment liquor on the surface of the main roll next succeeding the treatment roll by making said main roll of relatively small diameter, thereby increasing its angular velocity and providing greater centrifugal action on the liquor carried thereto by the thread.

The effectivenes of the action of each treatment liquor on the thread is, at least in part, a function of the period of contact of the thread with the roll applying said liquor to it. If the thread runs in tangential contact with the treatment roll, this period is a minimum. As the arc of contact is increased, however, in order to increase the said period, the normal line of the thread between successive main rolls flanking the treatment roll is distorted, and this introduces a new problem in ensuring that the conventional starting up band or thread wrapper used for initially laying the loops of thread on the main rolls can ride up onto the circumference of the treatment roll.

It is accordingly another object of the invention to provide a treatment roll having a stepped or a coned lead-in portion at the end first encountered by the band or wrapper to enable it to progressively ride up onto the full diameter cylindrical surface of the treatment roll. A similarly stepped or coned lead-out portion may also be provided at the other end of the treatment roll.

Alternative practical embodiments of the present invention will now be described by way of example only with reference to the accompanying drawings in which:

FIGURES 1 and 2 are side and end elevations, respectively, of one form of roll assembly in a machine according to the present invention;

FIGURE 1A shows the lower part of the machine of FIGURE 1;

FIGURES 3 and 4 are schematic side elevation and plan views, respectively, of a treatment roll unit;

FIGURE 16 is a schematic plan view of the machine of FIGURE 15;

Figure 2:
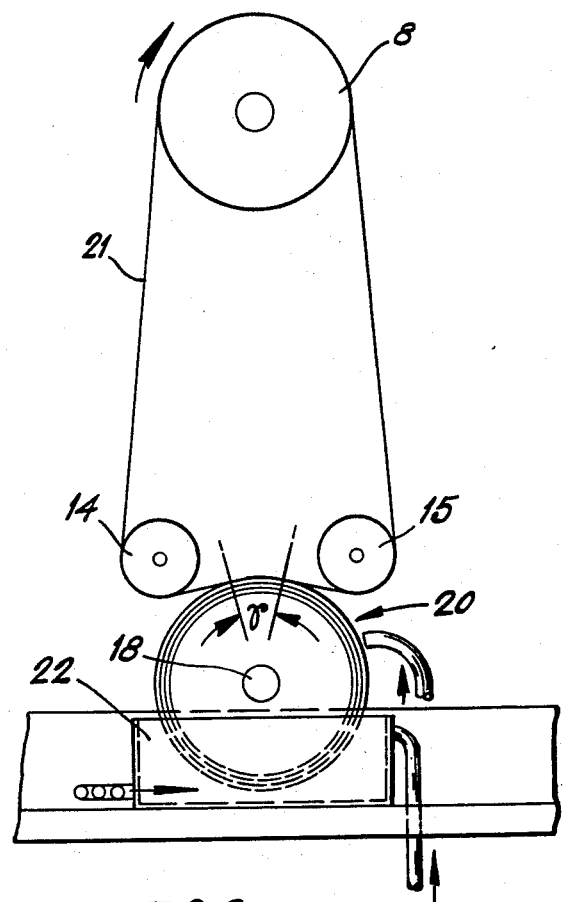

Referring first to FIGURES 1 and 2 of the drawings one unit of a multi-spindle viscose thread storing machine of generally known design in which an elongated cast iron bed 1 has seatings 2 for end frames 3. Also extending along the right-hand side (FIGURE 1A) of the bed below the level of the frame seatings 2 is a conventional coagulating bath A into which dip the usual spinning jets B one for each set of rolls 8, 14, 15 (see below), whilst along the other side of the bed 1 are arranged the customary bobbins C for the treated thread.

The upper ends of the end frames 3 are connected by longitudinal girders 4, 5 which carry bearings 6, 7 for the upper main rolls 8 of each unit, the bearing 7 being part of a driving gear assembly having a power input shaft 9 extending for the length of the girder 5. Beneath the girders 4, 5 are similar girders 10, 11 bolted to the lower ends of the frames 3 and carrying bearings 12, 13 for lower main rolls 14, 15 of smaller diameter than the roll 8, two rolls 14, 15 being placed beneath each roll 8. The bearings 12 form part of a drive input housing 16, all the latter being interconnected by a common drive shaft 17.

Between each pair of lower main rolls 14, 15 is a treatment roll unit consisting of a driven shaft 18 supported at one end in bearings in the housing 16 and at the other end in a bearing 19 on the girder 11 and carrying a group 20 of individual treatment rolls or sections which lie between the lower main rolls 14, 15. These individual treatment rolls or roll sections are referenced 20a . . . 20g in FIGS. 1, 3 and 4, and lie wholly outside the envelope formed by the thread loops 21, as seen best in FIGS. 2 and 4. The circumference of each treatment roll or roll section 20a . . . 20g dips into a respective treatment liquor trough or bath 22a . . . 22g. The group of rolls 20 may be constituted by separate rolls keyed at intervals along the shaft 18, or by axially spaced land portions of a single roll, and separated by deep radial gaps or grooves 20x, as seen more clearly in FIGS. 3 and 4. The nature of the liquors in the various baths 22 will depend on the treatment to which the thread is to be subjected. Such treatments may include extra acid treatment, hot acid treatment, washing, bleaching, desulphuring, colouring or dyeing, and applying finishing material—not necessarily in that order.

In a practical example of a thread treatment machine, successive troughs may contain acid, first and second washing water, bleach, third and fourth washing water, and a finishing liquor such as a soap solution or oil emulsion.

In the course of its travel from end to end of the main rolls 8, 14, 15 the thread 21 makes many loops at fairly closely spaced intervals, and is normally initially laid on the rolls by a conventional starting up band or thread wrapper, which is an endless band wrapped taut around the three main rolls in a triangular configuration (FIG. 2). This band then travels slowly along the rolls, the leading end of the thread being attached to it. As it encounters the first treatment roll section 20a, the band is stretched and forced to ride up on the circumference of the roll 20a. The attached thread 21 then follows in the path set by the band, and since all the rolls 8, 14, 15, 20a . . . 20g are driven at the same peripheral speed, no additional stretching action is exerted on the thread 21 itself.

When the machine is running and thread 21 is being advanced along the rolls 8, 14, 15 from the input to the discharge ends, the horizontal bottom run 21a of the thread is laterally deflected upwards and tensioned against the upper circumference of the successive treatment rolls or sections 20a . . . 20g. The roll unit 20 is rotated and each individual roll or section picks up treatment liquor on its circumference and applies it to the thread 21. The liquor from one trough 22 cannot, however, spread to a roll section running in an adjacent trough 22 by virtue of the depth of the intervening groove or gap 20x, and only a slight carry-over of liquor by residual wetness of the thread 21 takes place. This carry-over is considerably reduced by the centrifugal action on the thread of the small diameter main rolls 14, 15 flanking the treatment rolls. Each treatment zone is thus effectively isolated from its neighbours and the efficiency of thread treatment is markedly improved.

Figure 5:
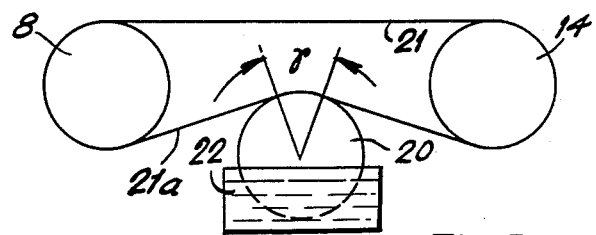
FIGURES 5–7 are schematic end elevations of alternative arrangements of treatment roll relative to the path of the thread.

FIGURE 5 illustrates diagrammatically a machine of the same basic kind as that shown in FIGURES 1 and 2 except that there are only two thread advancing rolls 8, 14 spaced horizontally and the lower run 21a of the thread bears against the upper arc of the intermediate treatment roll 20.

Figure 6:
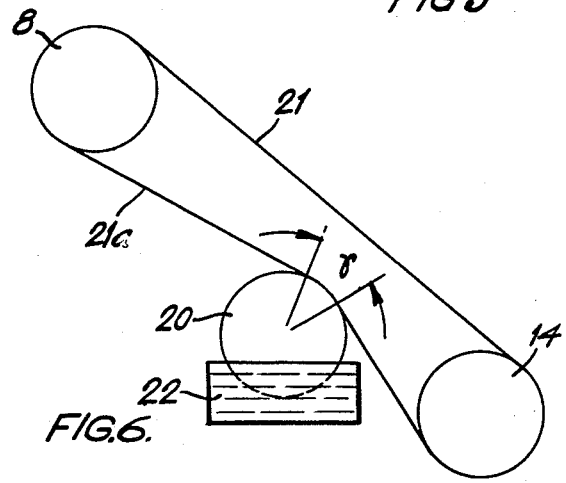

In FIGURE 6, the axes of the thread advancing rolls 8, 14 lie in an inclined plane, the lower run 21a of the thread 21 again making contact with the treatment roll 20.

Figure 7:
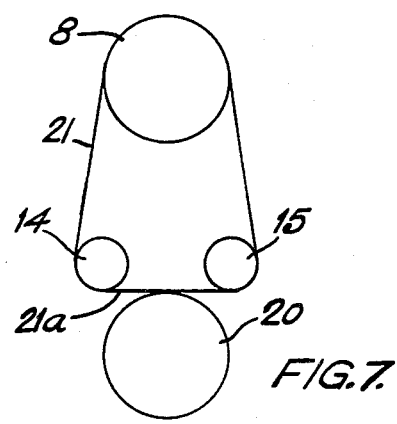

In FIGURE 7, the horizontal run 21a of the thread is tangential to the circumference of the treatment roll 20 and a minimum of treatment liquor is therefore picked up by the thread.

The arc of contact between the thread 21 and the circumference of each roll section 20a . . . extends over an angle γ, and this angle determines the quantity of treatment liquor picked up by the thread 21.

Figures 8, 9:
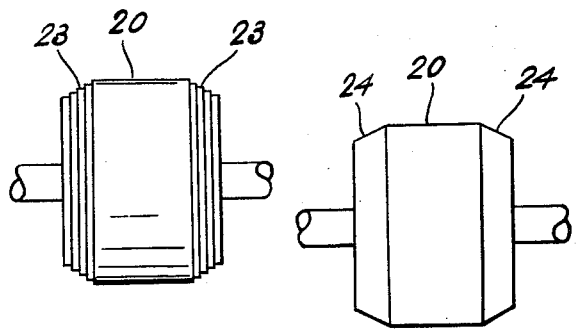
FIGURES 8 and 9 show alternative designs of an individual roll of a treatment roll and unit.

In order to facilitate the passage of the starting up band or thread wrapper onto each treatment roll 20a . . ., the opposite ends of the roll are stepped or tapered as shown at 23, 24 respectively in FIGURES 8 and 9. The stepped arrangement shown at 23 in FIGURE 8 is preferred whenever the angle γ sub-tended by the arc of contact of the thread 21 with a roll section is relatively large.

The width of face of each roll section 20a . . . of the treatment roll unit 20 is chosen so as to provide the desired amount or duration of treatment of the thread 21. For example, some roll sections may make contact with several turns of the thread 21 whilst other roll sections may make contact with only one or two turns. Furthermore, especially in respect of the washing treatment, a group of two or more roll sections may apply water which is fed to the respective troughs in counter-current to the direction of advance of the thread 21 as indicated at 20b, 20c; 22b, 22c and 20e, 20f; 22e, 22f in FIGURE 3. The purpose of feeding the water to the troughs 22b, 22c and 22e, 22f in counter-current is to ensure that the first roll section 20b, 20e in each such group applies water which may have become contaminated with the liquor from the next succeeding treatment roll section 20c, 20f, thereby diluting the liquor on the thread but not entirely removing it. The subsequent roll section 20c, 20f applies clean water to the thread 21 thus ensuring complete removal of the preceding treatment liquor.

Figures 10, 11:
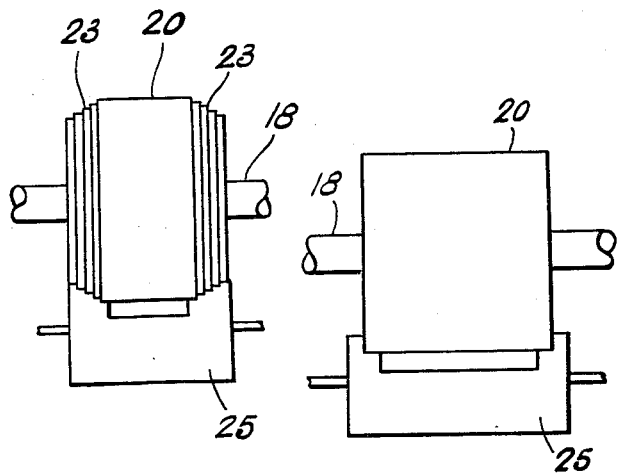
FIGURES 10 and 11 illustrate an additional feature.

Alternatively, in the case of each final roll section in a group of washing roll sections, clean water can be fed direct to the circumference of the roll section and collected in the respective trough beneath, accumulation of contaminated water on the roll surface being controlled by means of a doctor blade such as that shown at 25 in FIGURES 10 and 11. The blade 25 serves to deflect excess liquid from at least each end of the surface of the roll section into the respective trough.

In all the foregoing embodiments of the invention, the treatment roll unit 20 lies wholly outside the envelope formed by the loops of thread 21.

Figure 12:
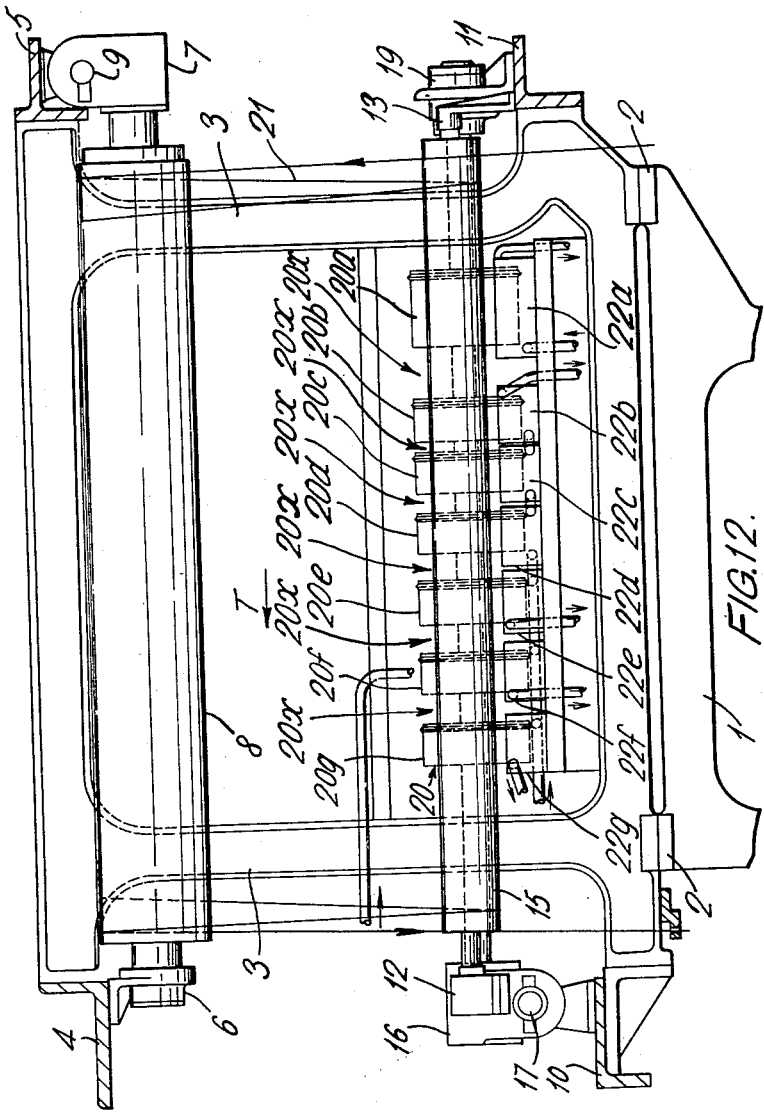
FIGURES 12 and 13 are respectively side and end elevation views of a modification of the machine of FIGS. 1 and 2.
Figure 13:
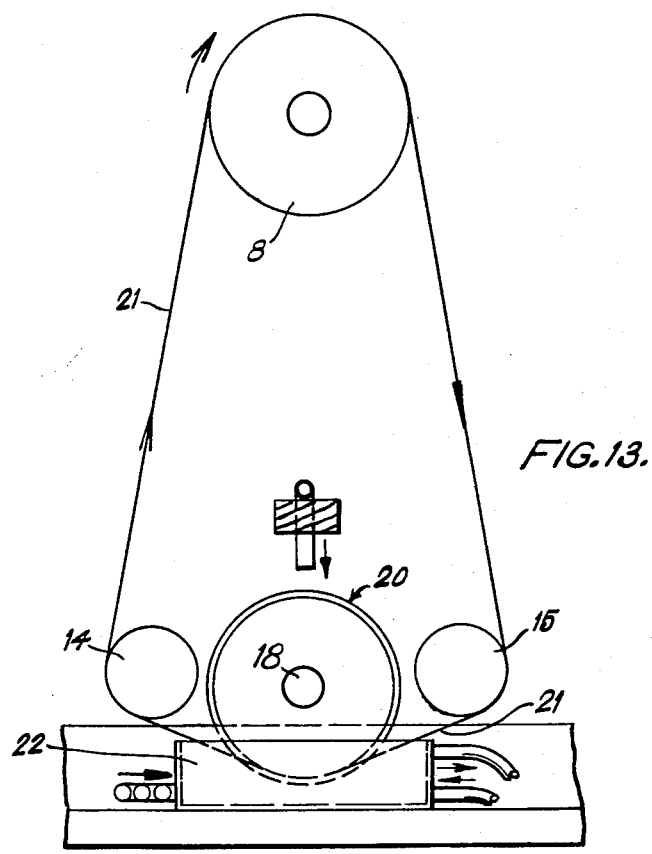

FIGURES 12 and 13 illustrate a modified form of the machine described above with reference to FIGS. 1 and 2. In this modification, the treatment roll unit is embraced by the thread envelope, together with the main rolls 8, 14 and 15, so that the thread 21 is passed beneath the successive roll sections 20a . . . 20g and immersed in the respective troughs or baths 22a . . . 20g of treatment liquor. This arrangement materially increases the arc of contact of the thread with the roll sections 20a. . . . On the other hand, the path length over the treatment rolls is considerably increased relative to that in the machine of FIGS. 1 and 2, and means must be provided to enable the starting up band or thread wrapper to ride up onto the roll circumference at each encounter with a treatment roll section 20a. . . . This could be achieved by manual operation, but it is preferred to provide each roll section with a lead-in formation such as an oblique slot in its end face which is first encountered by the band or wrapper during its traverse of the machine.

Figure 14:
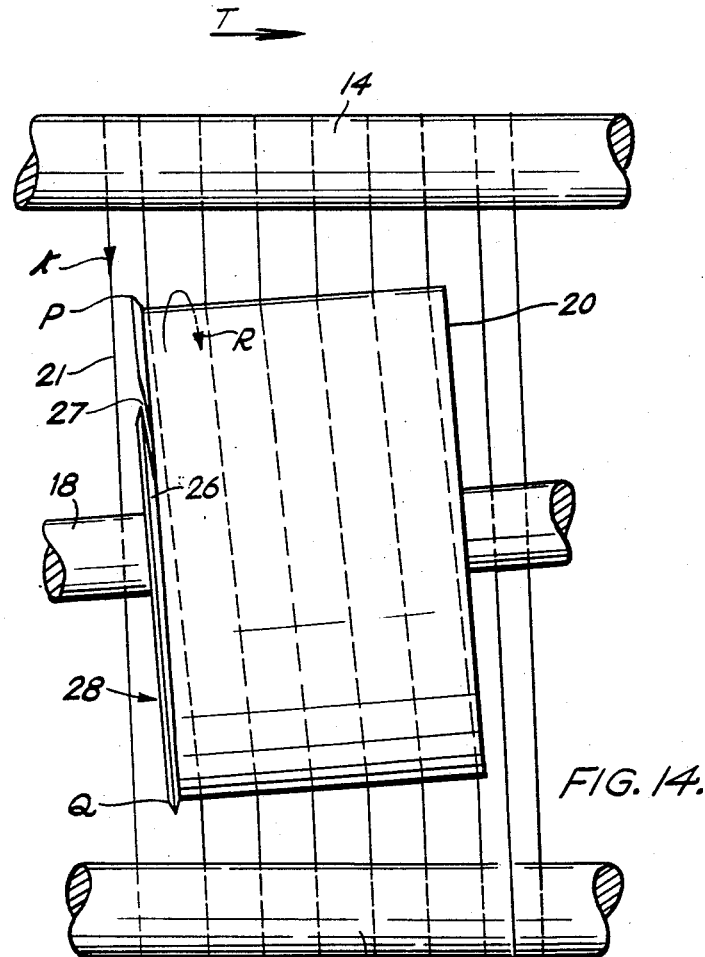
FIGURE 14 is a fragmentary plan of an arrangement of treatment roll which is particularly applicable to the machine of FIGS. 12 and 13.

FIGURE 14 illustrates an arrangement of treatment roll 20 having a flange 26 at its input end with an oblique gap 27 formed therethrough, the bottom or floor of the gap being, if desired, inclined to a plane tangential to the periphery of the roll at the gap 27. The starting up band thread wrapper thus engages in this gap during its traverse and is enabled to ride up onto the working peripheral surface of the roll.

FIGURE 14 also illustrates the variation in pitch of the successive loops of thread around the rolls 8, 14, 15, 20 which results from skewing through a few degrees the axis of the treatment roll shaft 18 with respect to the perpendicular to the free or unobstructed line of the thread between the rolls 14, 15. (For most practical purposes, due to the narrow spacing of adjacent loops of thread during operation of the machine, the free line of the thread between the rolls 14 and 15 can be regarded as perpendicular to the mean axis of the rolls.) In FIG. 14 the axes of the main rolls 14, 15 are assumed to be parallel, and the thread 21 is passing under the rolls 14, 20, 15 while the loops are traversed in the direction of the arrow T. In these circumstances, with the angle of skew of the shaft 18 in the sense shown, the loops are more widely spaced on the roll 20 than when the thread runs clear of the skewed treatment roll. If the shaft 18 is skewed in the opposite sense, the loops close up when they run over the treatment roll.

In the case illustrated, the starting up band or thread wrapper will run naturally onto the roll 20 because the leading edge 28 of the roll meets the oncoming band or wrapper at P in the correct rotational sense for passing the thread beneath it, as shown by the arrows R and *t*. It will normally, however, be required to close up the loop spacing on the treatment rolls, so that their axis will be oppositely skewed to that shown. In this case, the band or wrapper meets the leading edge 28 of the roll 20 at the point Q, where it would normally leave the roll, and abrasion is liable to occur. It is therefore very desirable to provide the leading end of the skewed roll 20 with a deflector. This can conveniently be in the form of a boss of sufficient diameter to engage the band or wrapper as approaches the roll, and of sufficient depth to prevent it from running against the edge 28 at Q.

Figure 15:
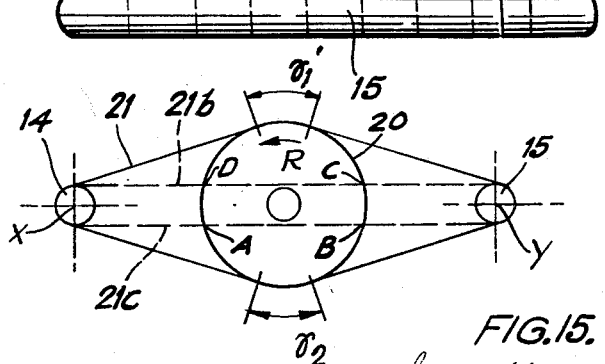
FIG. 15 is a diagram similar to FIGURE 7 illustrating a further modification.

FIGURE 15 is a diagrammatic analysis of the behaviour of another modified form of machine according to the present invention which, by reducing the length of the free run of the thread in air, materially facilitates control of the thread temperature within narrow limits. Here, the top main roll 8 of FIGURES 1 and 2 is omitted, so that the machine consists of the small main rolls 14, 15 flanking the treatment roll 20 symmetrically on opposite sides. The thread 21 now passes over both upper and lower equal arcs $\gamma_1$, $\gamma_2$ respectively of the circumference of each treatment roll 20, so that each loop adjacent an end of a treatment roll 20 crosses the end face twice— once on an upper run 21b and once on a lower run 21c. The line of the thread 21 thus intersects the path of the adjacent end edge of the roll at four points A, B, C, D. With the direction of rotation of the roll 20 indicated at R in FIGURE 15, the thread runs onto the roll at A and C. At the points B and D a guard formation will deflect the loop away from the end of the roll 20.

Figure 17:
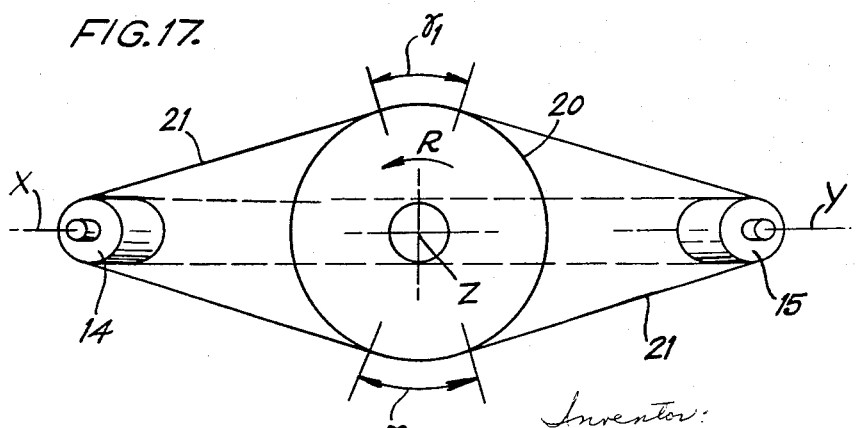
FIGURE 17 is an end view of the machine of FIGURE 16.

FIGURES 16 and 17 illustrate schematically a practical embodiment of the system outlined above. In these figures, the axes X, Y of the main rolls 14, 15 and the axis Z of the treatment rolls 20 are coplanar, the axes X and Y converging symmetrically at the discharge end of the machine. The direction of travel of the thread is indicated by the arrow T. The thread 21 passes around each of the main rolls 14, 15 and whenever it runs on a treatment roll 20 it passes alternately over an upper and an equal lower arc $\gamma_1$, $\gamma_2$ respectively (FIG. 17) of its circumference. The treatment rolls 20 dip into respective liquor troughs (not shown) to a depth at least up to the chord of the lower arc $\gamma_2$. Each roll 20 has thread pick-up formations (not shown) at each end so as to operate in the manner described with reference to FIG. 15. The rolls thus pick up threads so as to pass them under or over the rolls according to the loop positions, as described with reference to FIG. 15. When not running on the treatment rolls 20, the thread 21 moves in a flattened helical path around the two small main rolls 14, 15. The thread loops tends to adopt a uniform spacing or pitch $p_2$. When, however, the thread runs over the treatment rolls 20, the loop spacing is reduced to $p_1$. This is because the helix pitch is a function of the free length of a run between rolls.

Figure 18:
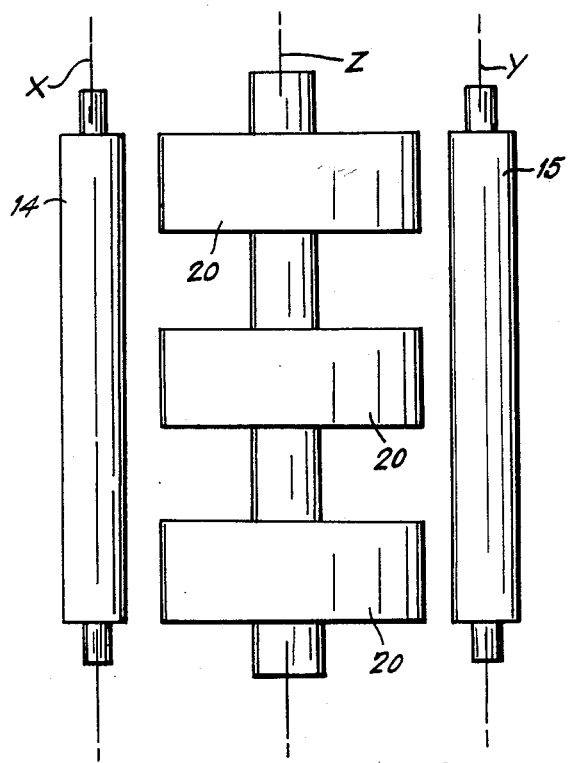
FIGURE 18 is a plan view similar to FIGURE 16 of a still further modification.
Figure 19:
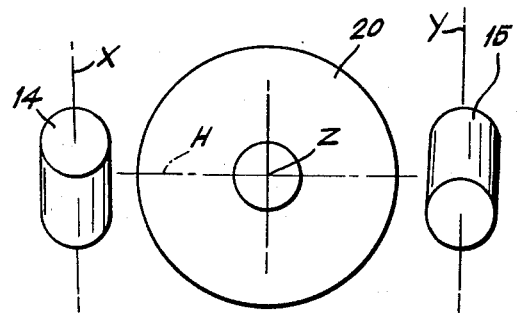
FIGURE 19 is an end view of FIGURE 18.

FIGURES 18 and 19 illustrate a further modified layout of machine with intermediate treatment rolls. In this modification, the main rolls 14, 15 have their axes X, Y equally but oppositely tilted with respect to the mean horizontal plane H (FIG. 19) of the machine containing the axis Z of the treatment rolls 20. By this arrangement, and by careful control of the angles of skew of the axes X and Y, the values of $p_1$ and $p_2$ of FIGS. 16 and 17 can be brought nearer to equality.

If preferred the arcs $\gamma_1$, $\gamma_2$ can be made unequal but the spacing between loop positions at the point of closest approach of the main rolls 14, 15 is a function of roll diameter only.

Normally, a treatment roll unit 20 is positively driven so that the roll circumference moves at the same peripheral speed as the thread 21. Such an arrangement, however, is not essential, and peripheral speeds of treatment roll which are greater or less than the linear speed of the thread 21 can be adopted if desired for special purposes. Care must, however, be taken to insure that damage is not caused to the thread due to excessive friction.

Normally, the working surfaces of the treatment roll unit 20 are cylindrical and the axis of the roll is parallel to that of the adjacent thread advancing roll 14 or 15 as the case may be. In some cases, however, it may be desirable to cone the working surface of the roll section.

I claim:
1. In a thread-storing thread advancing machine, two main rolls whose axes lie in parallel planes but are skewed relatively to each other; a treatment roll unit intermediate said main rolls and comprising a shaft located substantially symmetrically with respect to said main rolls, a plurality of treatment rolls spaced apart on said shaft and of such diameter that their circumferences intersect a common tangent to said main rolls in a plane normal to said shaft and on each side of said rolls; means for driving said main rolls and said treatment rolls at the same peripheral speed, and means for continuously supplying treatment liquor to said treatment rolls.

2. In a thread-storing thread-advancing machine, a pair of main rolls whose axes lie in a common plane and a treatment roll unit intermediate said main rolls and comprising a shaft whose axis lies in said common plane and is skewed so as to make a small angle with the mean direction of the axes of said main rolls, a plurality of treatment rolls spaced apart on said shaft, and means for supplying treatment liquor to said treatment rolls, the angle of skew of said treatment shaft axis being in the sense for changing the spacing between successive thread loops when the thread runs on said treatment rolls.

3. In a thread-storing, thread-advancing machine having a pair of main rolls mounted on nearly parallel axes around which thread is wrapped in a flat-sided helix, a plurality of treatment rolls spaced apart on a common shaft; means for driving said main rolls and said treatment rolls at the same peripheral speed; bearings for supporting said common shaft in a position such that the circumferences of said treatment rolls intersect, over a finite arc thereof, the normal tangent line of the thread between the main rolls on either side of said treatment rolls so as to deflect said thread from its natural path, and means for continuously wetting the circumferential surfaces of said treatment rolls with treatment liquor.

4. In a thread-storing, thread-advancing machine, three main rolls whose axes converge slightly and are arranged in a triangulated symmetrical pattern, two of said rolls being of substantially less diameter than the third and constituting the base of said triangle; a common drive for rotating all three rolls at the same peripheral speed; a treatment roll unit comprising a shaft having a plurality of treatment rolls spaced apart thereon, said shaft being located between the said smaller diameter main rolls so that the circumferences of said treatment rolls intersect, over a finite arc, the outer common tangent to said smaller diameter main rolls; means for causing the thread to ride up onto the circumference of said treatment rolls; and a driving connection between said common shaft and said common drive such that said treatment rolls rotate at the same peripheral speed as said main rolls; and means for continuously wetting the surfaces of said treatment rolls with treatment liquor.

5. In a thread-storing thread-advancing machine, three main rolls whose axes are mutually inclined at a small angle and lie substantially at the apices of an imaginary right triangular prism, the lower rolls being of smaller diameter than the upper roll; a treatment roll shaft lying generally parallel to and between said lower main rolls; a plurality of treatment rolls spaced apart on said shaft, the circumference of each treatment roll intersecting over a lower arc the normal line of the thread between said lower main rolls and having a lead-in formation at the leading end thereof relative to the direction of advance of the thread along said main rolls; a power drive for rotating all said main and treatment rolls at the same peripheral speed; and a treatment liquor supply to each treatment roll, said treatment rolls being arranged to carry the thread underneath them during its passage from one of the smaller main rolls to the other.

6. In a thread-storing thread-advancing machine, a pair of substantially parallel main rolls for carrying thread loops in a generally helical formation; a plurality of coaxial treatment rolls spaced apart axially by gaps extending radially inwards to a core diameter; bearings for supporting said treatment rolls in such a position that the circumference of each intersects over a significant arc the normal envelope of the thread loops passing over said main rolls so as to engage and deflect the thread on its passage between said main rolls; and means for supplying treatment liquor continuously to each treatment roll.

7. In a thread-storing, thread-advancing machine having main thread loop carrying rolls mounted on slightly converging axes; a plurality of treatment rolls assembled coaxially in spaced relation; a common shaft substantially parallel to said main rolls and carrying said treatment rolls; means for supporting said treatment roll shaft in a position such that the circumference of each treatment roll intersects the normal envelope of said thread loops intermediate two main rolls and deflects the thread out of the line of the common tangent to said main rolls, and means for continuously supplying treatment liquor to each treatment roll.

8. In a thread-storing thread-advancing machine having a pair of main rolls mounted on slightly converging axes for carrying thread loops, a plurality of treatment rolls assembled coaxially in spaced relation; a common shaft intermediate and substantially parallel to said main rolls and carrying said treatment rolls; means for supporting said treatment roll shaft in a position such that the circumference of each treatment roll makes contact with the thread over a large arc intermediate said main rolls, and a liquor trough beneath each treatment roll for continuously wetting the circumferential surface with treatment liquor.

9. In a thread-storing thread-advancing machine, an upper main roll; a pair of laterally spaced lower main rolls of smaller diameter; a power drive for said main rolls; a treatment roll shaft geared to said power drive; a plurality of separate treatment rolls spaced apart along said shaft, each of an axial length corresponding to the required extent of a thread treatment zone; bearings supporting said treatment rolls shaft in a position such that the circumferential surfaces of the treatment rolls engage the thread in its path between said lower main roll and deflect it laterally, and means for continuously supplying treatment liquor to each treatment roll.

10. In a thread-storing thread-advancing machine having a pair of main rolls mounted on nearly parallel axes around which thread is wrapped in a flat-sided helix; a plurality of treatment rolls spaced apart on a common shaft; means for driving said main rolls and said treatment rolls at the same peripheral speed; bearings for supporting said shaft internally of the envelope defined by said flat-sided thread helix so that the circumferential surfaces of said treatment rolls engage and deflect said thread helix intermediate said main rolls; and means for continuously wetting the circumferenting surfaces of said treatment rolls with treatment liquor.

11. In a thread-storing, thread-advancing machine, three main rolls whose axes converge slightly and are arranged in a triangulated symmetrical pattern, two of said rolls being of substantially less diameter than the third and constituting the base of said triangle; a common drive for rotating all three rolls at the same peripheral speed; a treatment roll unit located wholly within the envelope of the thread loops and comprising a shaft located intermediate the axes of said smaller diameter main rolls; a plurality of treatment rolls spaced apart along said shaft and engageable with the thread from above over a finite arc in its path between said smaller diameter main rolls; and a driving connection between said common shaft and said common drive such that said treatment rolls rotate at the same peripheral speed as said main rolls; and means for continuously wetting the surfaces of said treatment rolls with treatment liquor.

12. In a thread-storing, thread-advancing machine, three main rolls whose axes converge slightly and are arranged in a triangulated symmetrical pattern, two of said rolls being of substantially less diameter than the third and constituting the base of said triangle; a common drive for rotating all three rolls at the same peripheral speed; a treatment roll unit located wholly within the envelope of the thread loops and comprising a shaft located intermediate the axes of said smaller diameter main rolls; a plurality of treatment rolls spaced apart along said shaft; trough means beneath said treatment rolls for supplying treatment liquid to the circumferential surface of said treatment rolls, each of said treatment rolls being of a diameter to carry the thread downwards into said trough means, and a driving connection between said common shaft and said common drive such that said treatment rolls rotate at the same peripheral speed as said main rolls.

13. In a thread-storing, thread-advancing machine, two main rolls for carrying the thread in helical loops and whose axes lie in a common plane; a treatment roll unit intermediate said main rolls and comprising a shaft located substantially symmetrically with respect to said main rolls; a plurality of treatment rolls spaced apart on said shaft and of such diameter that their circumferences intersect a common tangent to said main rolls on each side of said common plane; means for driving said main rolls and said treatment rolls at the same peripheral speed, and means for continuously supplying treatment liquor to said treatment rolls.

14. In a thread-storing theread-advancing machine a pair of main rolls for carrying loops of thread to be treated and a treatment unit intermediate said main rolls and comprising a shaft; a plurality of treatment rolls spaced apart on said shaft; bearings locating said shaft in a position such that said treatment rolls intersect the normal line of the thread loops between adjacent main rolls; and means for supplying treatment liquor to said treatment rolls, the axis of said shaft being skewed through a small angle relative to the mean direction of said main rolls to vary the thread loop spacing.

15. In a thread-storing thread-advancing machine, a pair of main rolls for carrying loops of thread to be treated and a treatment unit intermediate said main rolls and comprising a shaft located within the envelope of said loops; a plurality of treatment rolls spaced apart on said shaft, and means for supplying treatment liquor to said treatment rolls, the axis of said shaft being skewed through a small angle relative to the mean direction of said main rolls, and each treatment roll having a main circumferential surface of a diameter to engage and depress the thread in its path between said main rolls while its ends are stepped in small increments of radius to facilitate running of the thread onto and off said treatment roll.

16. In a thread-storing thread-advancing machine, a pair of main rolls for carrying loops of thread to be treated and a treatment unit intermediate said main rolls and comprising a shaft located within the envelope of said loops; a plurality of treatment rolls spaced apart on said shaft, and means for supplying treatment liquor to said treatment rolls, the axis of said shaft being skewed through a small angle relative to the mean direction of said main rolls, and each treatment roll having a main circumferential surface of a diameter to engage and depress the thread in its path between said main rolls while its ends are coned to facilitate running of the thread onto and off said treatment roll.

17. In a thread-storing thread-advancing machine, the combination comprising advancing rolls extending in a common direction with a series of coaxial treatment rolls, said rolls being operatively associated to advance thread from one common end of the advancing rolls and the first treatment roll to the other common end of the advancing rolls and the last treatment roll by contact of the thread against the roll surfaces, said advancing rolls being radially spaced from each other and from the series of treatment rolls, said treatment rolls being arranged with respect to said advancing rolls to cause deflection of the thread and contact of the thread against the treatment rolls over a substantial arc of said treatment rolls during operation, said coaxial treatment rolls being spaced apart axially by gaps extending radially inward to a common shaft wherein the diameter of the treatment rolls greatly exceeds the diameter of the shaft; means permitting the treatment rolls to contact treating liquors; and means for driving said rolls at the same peripheral speed.

18. The apparatus of claim 17 wherein at least one of said advancing rolls has a diameter small in comparison with that of said treatment rolls.

19. The apparatus of claim 18 wherein the treatment rolls are provided with thread lead-in means.

20. The apparatus of claim 19 wherein the rolls have parallel axes.

References Cited by the Examiner
UNITED STATES PATENTS

| | | | |
|---|---|---|---|
| 135,518 | 2/73 | Brooks | 68—181 X |
| 2,107,451 | 2/38 | Oppenlaender. | |
| 2,197,145 | 4/40 | Engle | 68—175 X |
| 2,284,399 | 5/42 | Lely. | |
| 2,308,576 | 1/43 | Kornegy | 68—176 |
| 2,647,037 | 7/53 | Luther | 68—202 X |
| 2,688,863 | 9/54 | Luther | 68—22 |

FOREIGN PATENTS

| | | |
|---|---|---|
| 103,747 | 6/99 | Germany. |
| 165,553 | 11/05 | Germany. |
| 23,675 | 1907 | Great Britain. |

WALTER A. SCHEEL, *Primary Examiner.*

I. BUNEVICH, *Examiner.*